Jan. 18, 1944.   R. H. ZEILMAN   2,339,539
REAR AXLE MOUNTING FOR EXCAVATING AND LOAD HANDLING MACHINES
Filed Sept. 8, 1941   3 Sheets-Sheet 2

Roy H. Zeilman, INVENTOR.
BY Frank M. Slough,
Attorney

Jan. 18, 1944. R. H. ZEILMAN 2,339,539
REAR AXLE MOUNTING FOR EXCAVATING AND LOAD HANDLING MACHINES
Filed Sept. 8, 1941 3 Sheets-Sheet 3
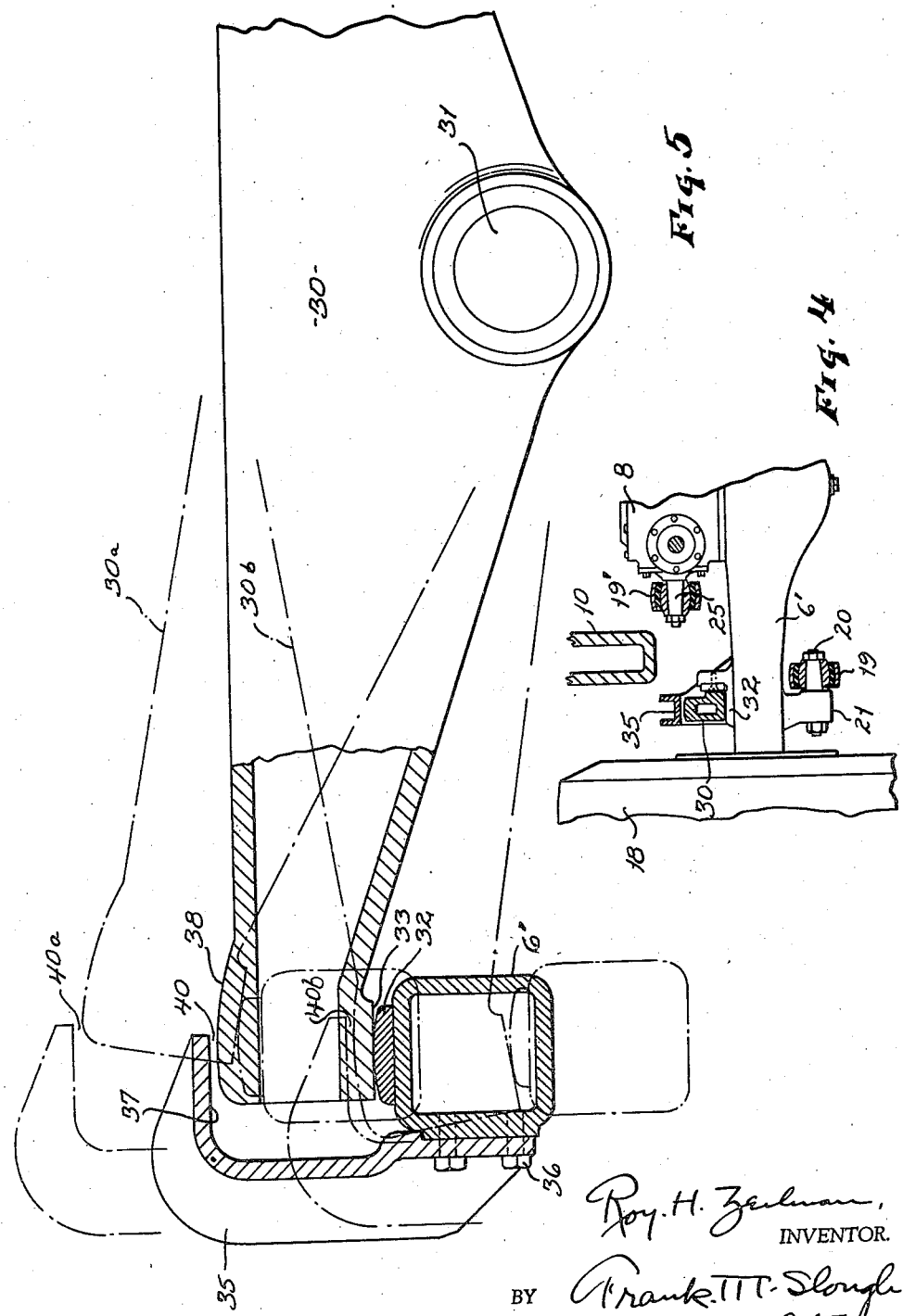

Patented Jan. 18, 1944

2,339,539

UNITED STATES PATENT OFFICE 2,339,539

REAR AXLE MOUNTING FOR EXCAVATING AND LOAD HANDLING MACHINES

Roy H. Zellman, Lorain, Ohio, assignor to Thew Shovel Company, Lorain, Ohio, a corporation of Ohio Application September 8, 1941, Serial No. 409,916

6 Claims. (Cl. 280—80)

My invention relates to excavating and load handling machines and relates more particularly to improvements in the rear axle mounting for the chassis supporting the superstructure utilized in connection with the excavating and load handling machine.

It is an object of my invention to provide such improved rear axle mounting whereby tandem wheels adapted to be associated therewith may be able to follow the contour of the terrain, and to maintain full traction when travelling over uneven ground, the necessary flexibility being provided in said rear axle mounting.

Another object of my invention is to provide such improved mounting for rear driving axles which will prevent their "rolling over" due to driving and braking torque, and eliminate the transfer of weight from one axle to another and the tendency of one axle to "dig in" more than the other axle.

A further object of my invention is to so mount the rear wheels of the truck carrying the superstructure as to distribute the load equally between the pairs of tandem wheels and to provide in the improved axle mounting of my invention the required rigidity and stability for crane, shovel operations and the like.

Other objects of my invention involve the utilization of a substantially rigid beam at each side of the chassis spring and pivoted thereto, intermediate the axle housing at each said side, with the free ends thereof extended to normally overlie and rest upon an upper surface of the two axle housings so as to carry the weight of the chassis and the chassis supported load upon said housing, and a substantially parallelogram torque rod assembly which may be of any presently known type for each laterally disposed end of each axle housing, said torque rod assembly pivotally interconnecting such axle housing end portion to the chassis frame intermediate the housing, or, by any equivalent means, to provide driving connections between said chassis frame and axle housing which will constrain said axle housing during up and down differential movements thereof to a substantially upright non-rotatable attitude.

It further involves the provision of a rebound keeper which, by an upper portion, confines each beam end at all times to close proximity to the axle housing and permits only a slight but substantially constant up and down movement between the supporting surface of said housing and the overlapping upwardly spaced lower surface of said keeper whereby, during vehicular travel over uneven terrain or use of the load carrying boom laterally of the vehicle, the chassis is limited to have slight tilting movement to restrict the displacement of the center of gravity of the chassis and carried load laterally of the longitudinal medial line of the chassis.

Another object of my invention is to provide an improved rear axle mounting for tandem axles of a boom supporting chassis wherein abrupt rapid changes in the amount of lateral load, or abruptly operating forces tending to tilt said frame will be so restricted in amplitude as to quite substantially decrease the shock upon said axles and keepers for the load supporting elements of said mounting.

These and other objects of my invention and the invention itself will be more readily apparent from the following specification and accompanying drawings, in which drawings:

Fig. 4 is a view taken from the line 4—4 of Fig. 2; and

Fig. 5 is a diagrammatic view partially in section of the rebound bracket and axle beam and trunnion utilized with the tandem wheel structure employed with the truck of Fig. 1.

Figure 1:
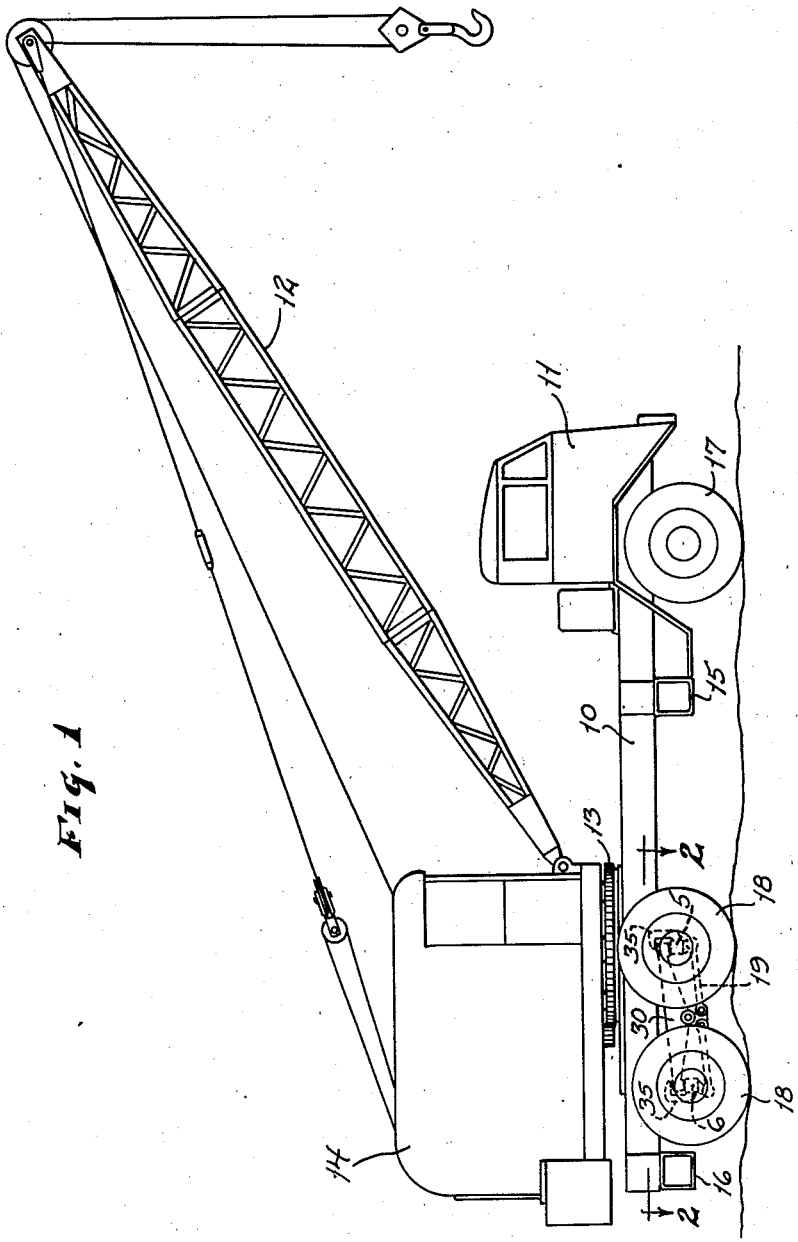
Fig. 1 is a side elevational view of an excavating and load handling machine in connection with which the improved axle mounting of my invention is employed.
Figure 2:
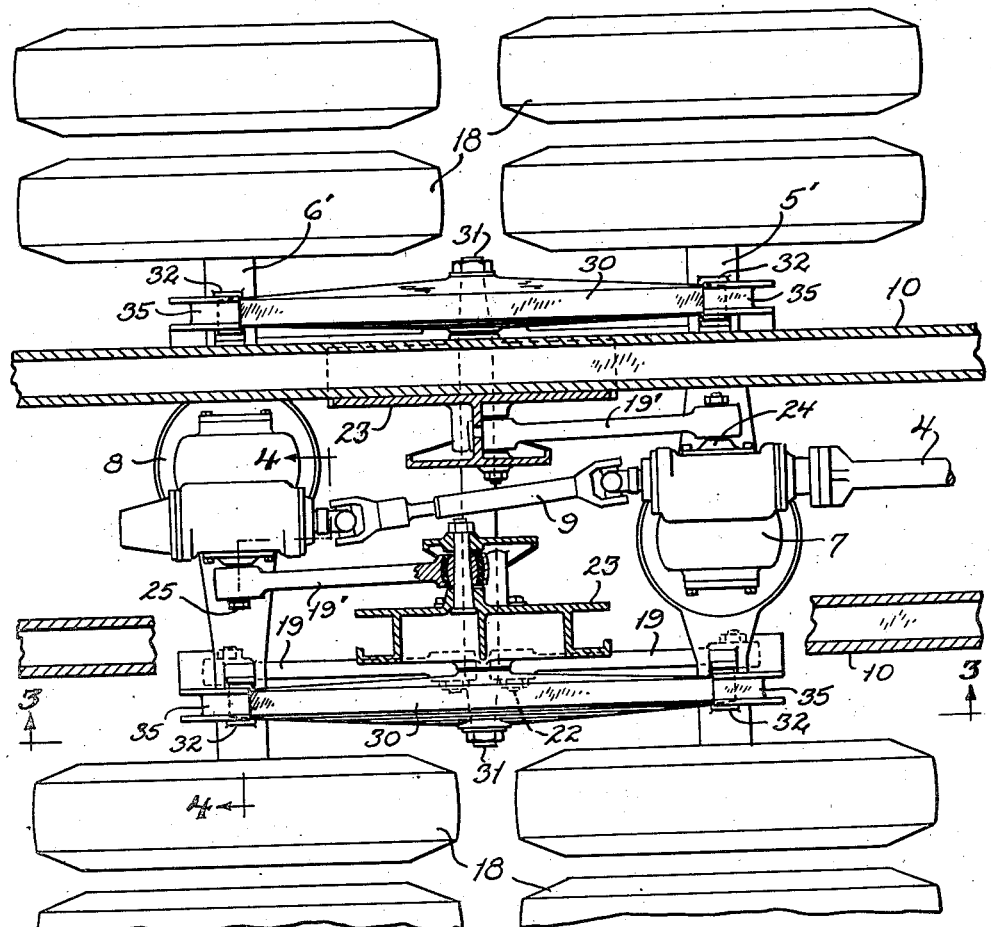
Fig. 2 is a horizontal section taken from the line 2—2 of Fig. 1 illustrating the improved rear axle mounting of my invention.
Figure 3:
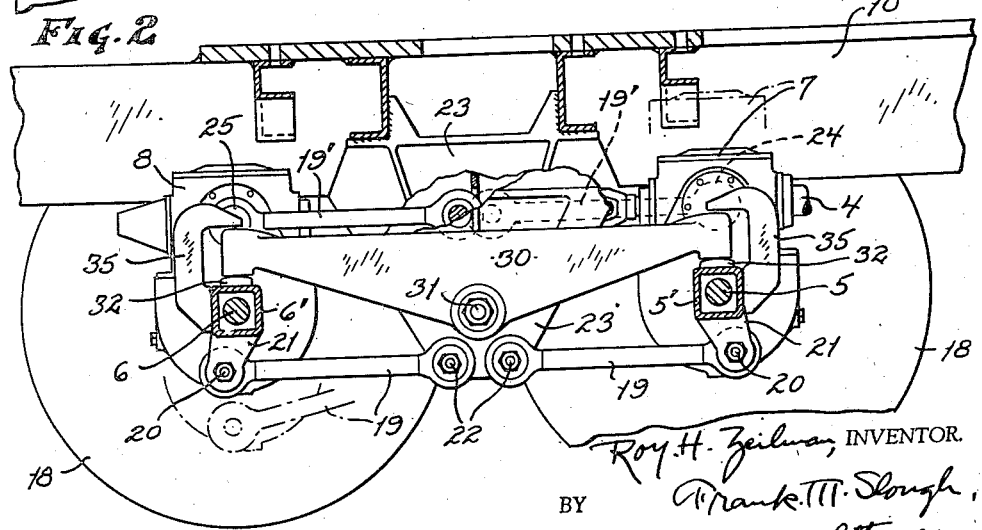
Fig. 3 is a view taken from the line 3—3 of Fig. 2.

In the embodiment illustrated in the drawings herein, I have illustrated in Fig. 1 a load handling machine comprising a truck chassis 10 upon which is mounted a vehicle cab 11, a superstructure 14 rotatably mounted upon a turntable 13, an operator's cab of the type adapted to be mounted on the operating mechanism supporting frame work of the excavating and load handling machine, shown in Fig. 1, to cover the power unit and operating mechanism thereof. Outriggers are mounted forwardly and rearwardly of the truck chassis, as indicated at 15 and 16 herein. The truck chassis is provided with a pair of forward dirigible wheels 17 and two pairs of rear tandem driven wheels 18, the tractive effort of the driving wheels being transmitted to the vehicle chassis by means of torque rods 19 and 19', said rods arranged to form two parallelograms one on each side of the unit, as best illustrated in Fig. 3. When the vehicle moves forward, the forward driving axle 5 pulls the chassis and the rear driving axle 6 pushes the chassis by means of the torque rod system, the differential 7 of the forward driving axle being directly connected to the differential 8 of the rearward driving axle by means of an intermediate propeller shaft 9 whereby torque is transmitted from the main propeller shaft 4 to the two axles.

In the embodiment illustrated, there are three torque rods associated with each axle, the two lower rods 19 in each case being pivotally connected at 20 to depending extensions 21 on the axle housings and at 22 to brackets 23 secured to the truck chassis 10 intermediate the axles. The single upper torque rods 19' are pivotally connected to their respective differential housings at 24 and 25 and to the brackets 23 at regions near the centerline of the vehicle. Due to the parallelogram arrangement each axle and its associated differential housing is maintained in a vertical plane while being allowed independent tipping in a transverse direction. As shown in Fig. 4, the torque rods are provided with spherical rubber pivot ends whereby the necessary freedom of motion as well as a cushioning effect is obtained.

The weight of the vehicle is transmitted to the axles through a pair of rocker beams 30. Each bracket 23 carries an outwardly extending trunnion 31 upon which the respective beam is pivotally mounted, the forward and rearward ends of each beam resting upon the corresponding axle housings 5' and 6' near the outer ends thereof. Curved wear plates 32 are secured to the housings at the regions of contact, as best illustrated in Fig. 5, coacting with plane lower surfaces 33 of the beam ends. Thus, as one axle rises higher than the other on uneven ground, the beam will tip and the chassis will be lifted a distance only one half the difference in the elevation of the wheels. During this tipping, the surfaces 33 slide over the curved wear plates 32, at all times maintaining an efficient load transmitting contact, the present embodiment having provided such curved wear plates 32 which have upper longitudinally convexly curved surfaces.

It may be stated that my invention contemplates any such expedient as reversing the relative forms of the confronting surfaces of the rocker beam ends. In other words, the surface 33 of such beam end could, in a broader phase of my invention, be longitudinally convexly curved and arranged to contact a fixed preferably hardened flat surface substituted for the wear piece 32 of the axle housing.

To prevent excessive rebound of the axles and to hold down the side of the chassis opposite that to which the boom of the crane, for example, may be swung, a rebound bracket or keeper 35 is provided at each of the four beam ends. As best illustrated in Fig. 5, the keeper is secured to the axle housing 6', as by bolts 36, and is formed as a hook which overlies the beam end as at 37.

Heretofore, in mountings of this type, the upper surface of the beam end has been flat and thus the amount of clearance between it and the keeper has varied as the beam assumed its various operating angles. In order to prevent binding when the beam end was in its extreme upper position, shown at 30a in Fig. 5, a spacing of the keeper was required which frequently proved excessive under the varying conditions of use of a boom carrying vehicle of the type described. When operating the crane boom out to one side of the vehicle, in cases when the outriggers are not used, the weight of the wheels and axles must be utilized to help balance the opposite side. With the excessive spacing previously mentioned, the vehicle had to tip a considerable amount before the weight of the wheels was applied by the keepers. This amount, of course, was greatly magnified at the outer end of the boom and the load being lifted tended to swing out beyond a safe operating radius. To overcome this disadvantage, the unsatisfactory expedient was resorted to of inserting flat metal bars, of the proper thickness, between the beam ends and the keepers. These, of course, prevented the beam from oscillating and could not be left in place when travelling.

In the present invention, the upper surface of the beam end is formed with a curve, as at 38 in Fig. 5, and it will be noted that practically the same clearance thus obtains between the beam end and the keeper throughout the range of action of the beam. The clearance, designated 40, 40a and 40b for the respective positions 30, 30a and 30b of the beam, thus need be very slight, sufficient merely to prevent binding, and at no position of the axles need the truck tip a substantial amount before the keepers come into action.

The nature of the longitudinally extending curve 38 will be best understood by assuming that such curve is generated by a downward projection from the lower surface of the tip of the keeper arm 37 to occupy the space indicated by the lead line from 40 so as to contact the upper surface of the beam, as illustrated in the position shown by solid lines of Fig. 5, and then, by rocking the parts to the relatively different positions shown in Fig. 5, the extreme lower edge of such theoretical projection from the keeper arm will generate the curved formation of the beam upper surface which is most desirable, since a curve so generated will, in all of the relatively disposed positions indicated in Fig. 5 for the cooperating parts, assure a constant spacing 40 as between the upper surface of the beam end and the arm 37 of the keeper.

It will be understood that the lateral curvature of the surface 38 is on a very considerable radius being merely sufficient to accommodate lateral rocking movement of the chassis relative to the axle housing.

The longitudinal curvature of the upper surface 38 of the beam end is progressively varied as to degree of curvature proceeding from the extreme end of such upper surface rearwardly thereof, as shown in Fig. 5, and is also shown in Fig. 4 as being laterally curved. In each case, at the upper and lower sides of the beam ends, I have provided confronting beam end surfaces for the keeper surface 37 and axle surface 32, one of each such pair of confronting surfaces being importantly curved in the longitudinal direction of the beam; and in the embodiment described, I have provided the upward facing of each pair of said surfaces with convexly curved surfaces which I prefer, although it will be understood that these formations of either or both pair of confronting surfaces may be reversed as to the respective surfaces of either or both pairs.

It will be noted that this construction in no way interferes with the oscillation of the beam and that the machine may therefore travel while a full load is suspended from its boom and at one side of the machine, an operation which was not previously practical. Under these conditions the beam ends, on the opposite side, ride against the lower surface 37 of the keepers, as the wheels rise and fall over uneven terrain, as efficiently as they normally ride on the wear plates 32.

Although I have shown and described preferred forms of my invention, I contemplate that numerous and extensive departures may be made therefrom without departing from the spirit of my invention or the scope of the appended claims.

Having described my invention what I claim is:

1. In a boom type excavating and load handling machine, a truck chassis supporting the same, a pair of tandem driven wheels each carried by a live axle housing, a parallelogram torque rod assembly interconnecting each said axle housing with said truck chassis intermediately of the housing at each vehicle side, a rigid rocker beam secured at each side of the chassis to the chassis and having pivotal connection therewith intermediately of the housing, the upper surface of each opposite beam end being convexly curved, the lower surface of each opposite beam end being flat and engaging a curved wear plate secured to the axle housing for each axle, a rebound keeper being further secured to each said axle and having a portion thereof overlying the outer ends of said beam, a slight clearance provided by a longitudinal curvature of each upper end surface of the beam at progressively varying rates of curvature being maintained between the beam end and overlying portions of the keeper throughout the range of action of the beam, said clearance being substantially constant throughout.

2. A multiple wheel vehicle for supporting and conveying a boom type excavating and load handling mechanism, comprising a chassis frame, a pair of driving axle housings disposed in tandem spaced relationship below said frame, a pair of tandem wheels each respectively supporting a different of said axle housings at each side of the frame, driving connections between each of said axle housings and each said frame side comprising parallel upper and lower torque rods respectively pivotally interconnecting a relatively upper element of said housing to a similarly elevated element of said frame, the pivotal connections between said frame and said rods being disposed between said axle housings, a rigid rocker beam for supporting each side of said frame upon the adjacent ends of said pair of axle housings, pivotally mounted between said axle housings upon a pendant extension of said frame and having opposite tip portions overlying said housings and each resting upon an upper surface of a different of said axle housings, a rebound keeper for each beam tip, each said keeper being of inverted L-form and rigidly secured by the lower end portion of its pendant arm to its associated said housing, with the uppermost horizontal arm thereof extending from beyond the end of, and normally overlying each said beam tip portion, and in close clearance spacing relative to the tip upper surface, said tip upper surface being longitudinally convexly curved proceeding rearwardly from its extreme end, the degree of such curvature thereof being progressively so varied in progressively different longitudinal portions of said tip surface, as to maintain a constant small clearance between the lower confronting surface of said upper keeper arm and the nearest confronting portion of said upper tip surface, under varying conditions of use of the vehicle as may position different wheels of each tandem pair at relatively variant levels and with both said wheels at variable distances from the intermediate vertical plane.

3. A multiple wheel vehicle for supporting and conveying a boom type excavating and load handling mechanism, comprising a chassis frame, a pair of driving axle housings disposed in tandem spaced relationship beneath said frame, a pair of tandem wheels each respectively supporting a different of said axle housings at each side of the frame, driving connections so interconnecting each said housing to said frame as to constrain up and down movements of said housing to an arcuate path concentric with an axis intermediate the pair of housings, and constantly restraining each said housing from rotational movements about its axis, and duplicated rigid rocker beams for supporting each side of said frame upon the adjacent end portions of said housings, pivotally mounted between said axle housings upon a pendant extension of said frame and having opposite tip portions overlying said housings and each resting upon an upper surface of a different of said axle housings, a rebound keeper for each beam tip, each said keeper being of inverted L-form and rigidly secured by the lower end portion of its pendant arm to its associated said housing, with the uppermost horizontal arm thereof extending from beyond the end of, and normally overlying each said beam tip portion, and in close clearance spacing relative to the tip upper surface, said tip upper surface being longitudinally convexly curved proceeding rearwardly from its extreme end, the degree of such curvature thereof being progressively so varied in progressively different longitudinal portions of said tip surface, as to maintain a constant small clearance between the lower confronting surface of said upper keeper arm and the nearest confronting portion of said upper tip surface, under varying conditions of use of the vehicle as may position different wheels of each tandem pair at relatively variant levels and with both said wheels at variable distances from the intermediate vertical plane.

4. In a boom type excavating and load handling machine, a vehicle comprising a truck chassis supporting the same, a pair of tandem axles, driven wheels disposed at each side of the chassis carried by each said axle, driving connections so interconnecting each said housing to said frame as to constrain up and down movements of said housing to an arcuate path concentric with an axis intermediate the pair of housings, and restraining each said housing from rotational movements about its axis, a rigid rocker beam pivotally secured to each side of the chassis intermediate the wheels at such chassis side, said beam adapted to support the weight of the truck chassis frame upon both axle housings, the opposite ends of said beam each resting upon an upper surface of one of said axle housings, a wear plate secured to the upper surface of each said housings, a convex upper surface of said wear plate and a beam end rebound keeper rigidly affixed to each said housing, said keeper projecting upwardly thereof beyond said beam ends and comprising a horizontal uppermost arm reentrantly overlapping the associated beam end, the upper surface of said associated beam end being longitudinally convexly curved at such a constantly variable rate of curvature throughout its curved extent, substantially as would be generated by a straight line extending at right angles to said horizontal keeper arm and closely below the underside of the free end of said arm, said line and keeper arm relative positions being maintained during up and down oscillatory movements of the pair of wheels at the corresponding sides of the chassis over the entire operative range of such movements, while said beam end rests upon its associated wear plate.

5. In a boom type excavating and load handling machine, a vehicle comprising a truck chassis supporting the same, a pair of tandem axles, driven wheels disposed at each side of the chassis carried by each said axle, driving connections so interconnecting each said housing to said frame as to constrain up and down movements of said housing to an arcuate path concentric with an axis intermediate the pair of housings, and restraining each said housing from rotational movements about its axis, a rigid rocker beam pivotally secured to each side of the chassis intermediate the wheels at such chassis side, said beam adapted to support the weight of the truck chassis frame upon both axle housings at said side, the opposite ends of said beam each resting upon an upper surface of one of said axle housings, a beam end rebound keeper rigidly affixed to each said housing, said keeper projecting upwardly thereof beyond said beam ends and comprising a horizontal uppermost arm reentrantly overlapping the associated beam end, said keeper arm and the upper surface of said axle defining the parallel arms of a recumbant U-shaped channel for endwise reception of the associated beam end, the inner surface of each of said arms and the adjacent surface of said beam end being disposed in opposition to each other, whereby two pairs of opposing surfaces are provided, said pairs of surfaces each comprising one longitudinally convexly curved surface, and all of said surfaces being relatively so formed and spaced, as to maintain a constant small clearance between the lower surface of said upper keeper arm and the opposing adjacent portion of the surface of the associated beam end under varying conditions of use of the vehicle as may position different wheels of each tandem pair at all operative relatively variant levels and with both said wheels at resultantly variable distances from the intermediate vertical plane, and with the lowermost confronting surfaces of said beam ends and axle housing in weight-sustaining relative contact.

6. A multiple wheel vehicle for supporting and conveying a boom type excavating and load handling mechanism, comprising a chassis frame, a pair of driving axle housings disposed in tandem spaced relationship beneath said frame, a pair of tandem wheels each respectively supporting a different of said axle housings at each side of the frame, driving connections so interconnecting each said housing to said frame as to constrain up and down movements of said housing to an arcuate path concentric with an axis intermediate the pair of housings, and constantly restraining each said housing from rotational movements about its axis, and duplicated rigid rocker beams for supporting each side of said frame upon the associated laterally portions of said housings, the under surface of each opposite end portions, at least one of said contacting surface being curved in a direction longitudinal of said beam, a rigid rebound keeper extension of said housing extending upwardly beyond the extreme end of each said beam and upwardly terminating in a reentrantly extending normally substantially horizontal keeper arm overlying the associated beam end portion, said beam end portions projecting within the spacing between said keeper arm and said upper housing surface to substantially varying distances and at varying angles according to the relatively angular position of said beam relative to a plane parallel to said chassis frame, said keeper arm and the upper side of said beam end providing a pair of mutually confronting surfaces, said surfaces being cooperatively so formed and dimensioned and said beam end being of such vertical thickness as to provide a small constant spacing clearance between said confronting surfaces during all operative conditions when said first pair of contact surfaces are in contact, said clearance space providing limits for tilting movements of the chassis during use of the boom on said vehicle.

ROY H. ZEILMAN.